May 27, 1947.  W. C. ROBINETTE  2,421,355

HIGH SPEED MOTOR

Filed June 6, 1944

INVENTOR.
WILLARD C. ROBINETTE
BY
Lippincott & Metcalf
ATTYS.

Patented May 27, 1947

2,421,355

UNITED STATES PATENT OFFICE 2,421,355

HIGH-SPEED MOTOR

Willard C. Robinette, South Pasadena, Calif.

Application June 6, 1944, Serial No. 538,958

18 Claims. (Cl. 172—274)

My invention relates to induction motors, especially to induction motors of the polyphase type, and deals primarily with an improved system for controlling and regulating the speed of such motors. To facilitate understanding the principles of my invention, its application to polyphase motors will be dwelt upon primarily in the ensuing description.

A conventional polyphase motor generally comprises a stator, and a rotor, the stator having windings thereon for producing a magnetic field which rotates in space about the motor axis, while the rotor carries a coil or its equivalent for causing the rotor to rotate in the direction of the magnetic field produced by the stator. Generally in such a motor the rotor comprises a soft iron armature, the rotor coil is wound, and the rotating magnetic field produced by the stator induces electrical currents in the conductors of the rotor coil, thus effectively producing magnetic poles in the armature and thereby causing the rotor to be drawn, or pulled, in the same direction as the rotating field. As a result the rotor is able to exert a torque or rotational force upon a load attached to a shaft upon which the rotor is mounted. In such induction motors the speed of rotation of the rotor is limited to the synchronous speed, that is to the speed of rotation of the magnetic field and the actual speed of rotation falls somewhat short of the synchronous speed by an amount which increases in accordance with the amount of the load being driven from the rotor shaft.

Accordingly it is the principal object of my invention to provide an improved induction motor which may be operated at a super-synchronous speed, that is at a speed greater than synchronous speed.

Another object of my invention is to provide an improved means for operating an induction motor at a selected speed in a wide speed range.

Another object of my invention is to provide an induction motor with improved means for regulating the speed of the motor so that the speed of rotation is substantially independent of changes in load.

An induction motor incorporating my invention comprises one member, such as the stator, having means for producing a magnetic field which rotates with respect to this member, and a second member, such as a rotor and a pair of windings associated therewith which windings are linked with said magnetic field, and means controlled by the voltage induced in one of said windings for controlling the current in the other winding.

More specifically, a polyphase motor incorporating the features of my invention comprises a stator having a polyphase winding for producing the rotating magnetic field and a rotor upon which there is mounted a main winding and an auxiliary winding. To control the speed of such an induction motor a circuit network is provided interconnecting the rotor auxiliary winding and the rotor main winding, this circuit including suitable phase adjusting means and amplifying means for controlling the current in the rotor main winding and hence the magnetization of the rotor in whatever manner may be desired for controlling the speed of the rotor.

In one of the preferred embodiments of my invention, the voltage induced in the rotor auxiliary winding from the stator is amplified to a value greater than twice that of the voltage induced in the rotor main winding from the stator, and this amplified voltage is applied to the rotor main winding in opposite phase to that induced therein due to the rotating magnetic field of the stator, thus causing the rotor to rotate at a super-synchronous speed in a direction opposite to the direction of rotation of the rotating field.

According to my invention, the speed of the motor may be controlled by varying either the degree of amplification or the phase of the voltage thus applied to the rotor main winding. Also, I have found that advantageous results are realized by feeding to said rotor main winding, energy at a higher frequency, such as at an harmonic frequency of the voltage induced in said rotor main winding.

Furthermore, in accordance with my invention, the speed of operation of a motor may be held to a very nearly constant value by inserting a suitable filter in the circuit network connecting the rotor auxiliary winding to the rotor main winding whereby the filter acts to vary the amplification in the circuit network in response to changes in load to produce corresponding changes in rotor torque with little change in rotor speed. For this purpose, advantage may be taken of the characteristics of a sharp cut-off low pass filter.

My invention together with other objects and advantages thereof will be more readily understood by reference to the following description taken in conjunction with the accompanying drawings wherein.

Figure 1:
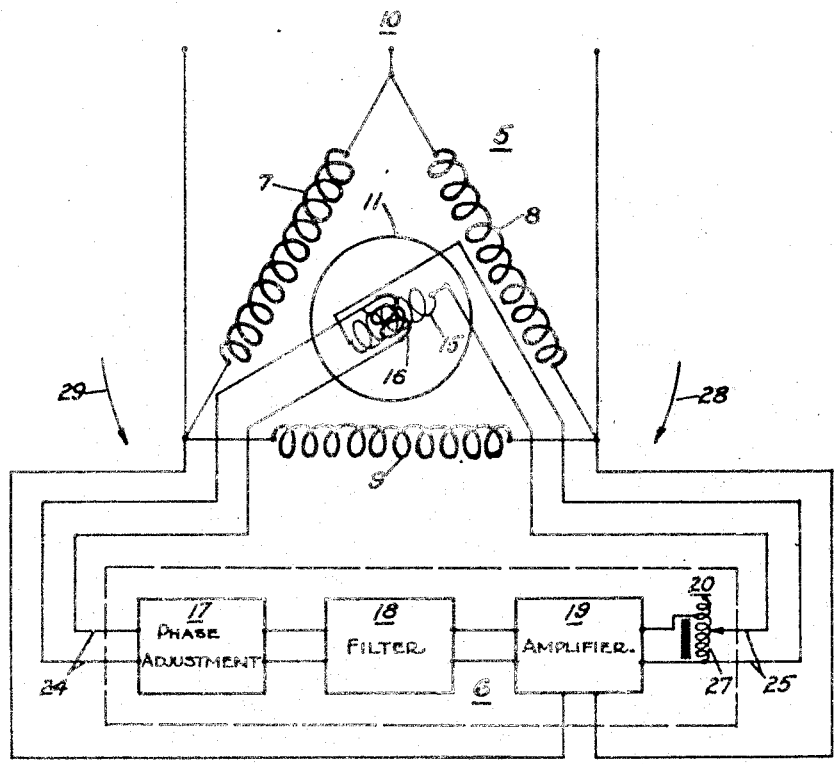
Figure 1 is a schematic diagram of a two pole, three phase motor in a system embodying the principles of my invention.

Referring to Figure 1 there is illustrated a two pole, three phase motor 5 and a cooperating control network 6 incorporating features of my invention. This motor comprises a stator provided with three space phased coils 7, 8 and 9, delta connected to a three phase power supply 10, and a rotor, indicated by the circle 11, having mounted thereon a rotor main winding 15 and a rotor auxiliary winding 16. The control network 6 here illustrated, comprises a phase adjusting network 17, a filter 18, and an amplifier 19, and a transformer 20, preferably of the auto-transformer type, connected in tandem in the order named. The input 24 and the output 25 of the control network 6 are connected respectively to the rotor auxiliary winding 16, and the rotor main winding 15 on the rotor 11 through slip rings (not shown), and the control network 6 operates to amplify the voltage induced in the auxiliary winding 16 and apply the amplified voltage to the main winding 15.

The input impedance $Z_i$ of the control network 6 is preferably made large so that little current will flow through the auxiliary coil 16 and the output impedance $Z_o$ of the control network 6 is preferably made small so that large current will flow in the main winding 15, thereby making possible efficient magnetization of the soft iron armature of the rotor 11 upon which the rotor auxiliary winding 16 and the rotor main winding 15 are mounted.

The rotor auxiliary winding 16 is preferably wound at right angles to the main winding 15 in such a manner that it will have no voltage induced in it from any current flowing in the rotor main winding. Thus, the only voltage induced in the auxiliary winding is that due to the three phase rotating field. When my invention is applied to a rotor having more than two poles, the rotor windings are preferably wound so that they are about 90° apart electrically. Thus, in any event the rotor main winding and rotor auxiliary winding are preferably disposed in spaced relationship on the rotor to minimize any inductive coupling between the two.

The phase adjusting network 17 may be of any suitable or conventional type comprising a plurality of at least two unlike electrical impedances such as inductances, capacitances, and resistances. At least one of these impedances is preferably variable whereby the phase of the voltage derived from the auxiliary coil 16 may be applied in any desired phase to the filter 18, the amplifier 19, the transformer 20, and hence to the main winding 15.

The filter 18 may be of any conventional adjustable type suitable for setting the high frequency cut-off characteristic for maintaining close regulation of the speed of the motor as will be more fully explained hereinbelow.

The amplifier 19 may be of any conventional type having uniform and high amplification for voltages of all frequencies applied thereto, whereby it is suitable for producing a high voltage across the secondary 27 of the transformer 20 connected between the amplifier output and the main winding 15 of the rotor. Power may be applied to the amplifier from one phase of the power line 10.

To simplify the discussion of the operation of this motor 5 it will be assumed that when power is applied to the windings 7, 8, and 9 of the stator a magnetic field is produced which rotates in the clockwise direction. Thus when the rotor rotates in the same direction as the magnetic field it also rotates clockwise and when the rotor 11 rotates in a direction opposite to the magnetic field it rotates counter-clockwise. Clockwise and counter-clockwise directions of rotation are indicated by the arcuate arrows 28 and 29 respectively in the drawing.

By suitable selection of the characteristics of the phase adjusting network 17, the filter 18, and the amplifier 19, in accordance with the principles of my invention, the rotor 11 may be operated in a clockwise direction over a wide range of speed between a value a little below synchronous speed and zero speed, or in a counter-clockwise direction between zero speed and a high speed well above synchronous speed. The design of phase adjusting networks, filters, and amplifiers is well known in the art and need not be described in detail here. Their characteristics alone will be noted. For convenience the constants of the elements of the phase adjusting network 17, the filter 18, and the amplifier 19 are preferably made variable.

Consider now the case where the constants of the control network 6 are such that the voltage $E_o$ produced across the output 25 in response to the application of a voltage $E_a$ to the input of said network from the auxiliary winding 16, is out of phase with the voltage $E_m$ induced in the main rotor winding 15 by the rotating field. Such a phase relationship can always be achieved even when the frequency of the voltages $E_a$, $E_o$, and $E_m$ is varying, by simply changing the value of one or more impedance elements of the phase adjusting network 17. If the voltage $E_o$ produced at the output of the control network 6 is very small compared to the voltage $E_m$ induced in the rotor main winding, then the current produced in the rotor main winding 15 lags the induced voltage $E_m$ by an angle less than 90 degrees and the rotor rotates in a clockwise direction at about the same speed that it would operate if there were no connections whatever between the rotor auxiliary winding and the rotor main winding.

If, however, the gain of the amplifier 19 is raised and the amplified voltage $E_o$ is made comparable to but less than the voltage $E_m$ induced in the main winding, by the rotating magnetic field, the total effective voltage $E_t$ in the circuit including the rotor main winding is lowered, thus causing the rotor to be magnetized to a smaller extent and thereby operate at a lower speed. Thus as the net voltage $E_t$ in the circuit including the rotor main winding 15 is decreased by raising the value of the amplified voltage $E_o$, the speed decreases in a corresponding manner until when the net voltage is zero, the rotor remains stationary in spite of the fact that voltage is applied to the stator from the source of power 10.

When the amplification in the control network is further increased so that the amplified voltage $E_o$ is greater than the voltage $E_m$ induced in the rotor main winding 15 by the rotating magnetic field, the net voltage in the circuit including the rotor main winding becomes opposite to that induced therein from the stator, and the current produced in this winding is of opposite phase to that previously obtained thus causing the rotor armature to be magnetically polarized in an opposite direction than heretofore. Because of this reversal of polarity, the torque produced on the rotor by virtue of the reaction between the rotating magnetic field produced by the stator and the magnetic field produced by the current in the rotor main winding is reversed and the rotor 11 rotates in a counter-clockwise direction.

Thus by applying to the rotor main winding 15 a supplemental voltage from the control circuit, greater than that induced in this winding by the rotating field of the stator, I am able to cause the rotor to rotate in a direction opposite to that of the rotating field produced by the polyphase stator winding.

As the amplified voltage $E_o$ is further increased, the net voltage $E_t$ in the circuit including the rotor main winding 15 increases in magnitude and so also does the speed of rotor rotation. If the amplification is raised to a suitably high value, the speed of rotation in a direction opposite to the rotation of the rotating field may be increased indefinitely until it is much greater than the synchronous speed. More specifically if the amplified voltage is more than twice the voltage induced in the rotor main winding and is applied to the rotor main winding in opposite phase, the speed of rotation of the rotor may be made to exceed the synchronous speed.

Regardless of the phase relation between $E_o$ and $E_m$, such counter-clockwise rotation is obtained as long as the total voltage E in the main winding 15 produces a current in the main winding having a component which is opposite in phase to the induced voltage $E_m$.

I have found that for a given load condition the actual speed of rotation of the rotor 11 depends upon the electro-motive force induced in the rotor winding, the amplification produced in the control circuit, the relative phase of the amplified voltage $E_o$ and the voltage $E_m$ induced in the rotor main winding. I have further found that the speed of rotation may be readily stabilized at any predetermined value most readily by utilizing a low pass or a band pass filter 18 in the control network and adjusting the high cut-off frequency $f_c$ of this filter to about the value of the slip frequency $f_s$ corresponding to the speed at which I desire to operate the motor as more fully explained hereinbelow.

It is to be noted that the voltages induced in the main winding 15 and auxiliary winding 16 are of an alternating nature. The frequency $f_s$ of these voltages, which may be called the slip frequency, depends on the frequency $f_o$ of the line voltage applied to the stator winding, the speed of rotation S of the rotor and the number of poles P of the motor in accordance with the following equation $$S=\frac{120}{P}(f_o-f_s)$$

where S is in R. P. M. and $f_o$ and $f_s$ are in cycles per second. Positive values of S represent clockwise rotation of the rotor and negative values represent counter-clockwise rotation of the rotor. Thus when the rotation is clockwise the slip frequency $f_s$ is always less than the line frequency $f_o$ and when the rotation is counter-clockwise the slip frequency $f_s$ is always greater than the line frequency $f_o$.

It should also be noted that the respective voltages induced in the rotor main winding and in the rotor auxiliary winding are substantially proportional to each other and increase directly as a function of the slip frequency. Accordingly as long as the amplified voltage $E_o$ and the voltage $E_m$ induced in the main winding 15 by the stator field are in the same relative phase then for a given value of amplification in the control network 6 the net voltage $E_t$ in the main windings is also substantially proportional to $E_o$, and the slip frequency.

Figures 2, 3:
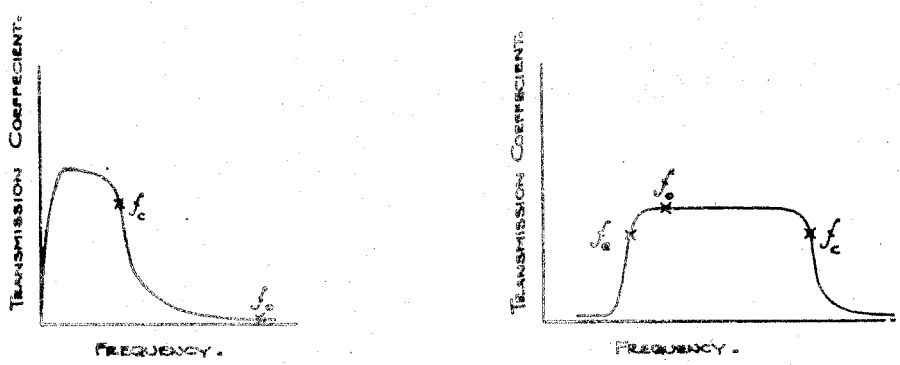
Figure 2 is a graph showing the characteristics of a low pass filter which may be utilized to maintain the speed of such a motor very nearly constant with changes in load.
Figure 3 is a graph showing the characteristics of a band pass filter which may be utilized to maintain the speed of such a motor very nearly constant with changes in load.

Considering now the operation of the motor 5 when the filter 18 is of the low pass type and has a high cut-off frequency $f_c$ less than the line frequency $f_o$, the characteristics of a control network including such a filter are shown in Figure 2 where ordinates represent transmission coefficient and abscissae represent frequency. The cut-off at the lower frequency end is attributable to coupling condensers normally present in an overall system of this kind, as between the filter and amplifier, and is not pertinent to the operation of the present invention.

In the pass range of this filter, the overall amplification of the control network 6 is greater than the ratio $$\left(\frac{Em}{Ea}\right)$$

of the voltages respectively induced in the main winding 15 and the auxiliary winding 16. In the high frequency highly attenuated range the amplification of the control network 6 is less than this ratio. The cutoff frequency $f_c$ lies between these ranges. When voltage is first applied to the windings 7, 8, and 9 of the stator from the power supply 10, a magnetic field is produced by the stator, this magnetic field rotating in a clockwise direction. While the rotor 11 is still at rest, the voltages induced in both the rotor main winding 15 and the auxiliary motor winding 16 have a frequency $f_o$ the same as the frequency of the voltage applied to the stator from the power supply 10 at this moment. Due to the high attenuation of the filter 18 the amplified voltage $E_o$ applied to the main winding 15 by the control network 6 is much less than the voltage $E_m$ induced in the rotor main winding by the rotating field. The torque produced upon the rotor by the reaction between the rotating field and the magnetization induced in the rotor armature causes the rotor to accelerate in a clockwise direction. As the speed of the rotor 11 increases in a clockwise direction, the amplitude and frequency of the voltages induced in the main and auxiliary windings 15 and 16 decrease. The amplitude of the voltages induced in the two windings is substantially proportional to the frequency of the induced voltages, this frequency in turn being proportional to the difference between the actual speed of rotation of the rotor and the speed of rotation of the rotating magnetic field produced by the stator.

As the slip frequency $f_s$ approaches the cut-off frequency $f_c$ of the filter 18, the amplification of the control network 6 increases thereby increasing the value of the voltage $E_o$ appearing at the output of the network 6 and applied to the main winding 15, thus reducing the net voltage $E_t$ in the main winding. As the net voltage $E_t$ in the main winding falls off, the magnetization of the rotor 11 decreases and the torque produced on the rotor 11 by virtue of its reaction with the rotating magnetic field produced by the stator falls off rapidly until it equalizes the torque of the load and the motor speed remains constant at a value corresponding to about the cut-off frequency $f_c$.

It will be apparent from the curve of Figure 2 that at this speed because of the sharp cut-off characteristic of the filter 18, the torque furnished by the rotor 11 varies rapidly for small changes in speed of the rotor and that for widely different loads the speed of motor operation will be approximately that corresponding to a slip frequency $f_s$ about equal to the high cut-off frequency $f_c$.

Similarly, considering now the operation of the motor 5 when the filter 18 is of the band pass type having a low cut-off frequency $f_1$ less than the line frequency $f_0$ and a high cut-off frequency $f_c$ greater than the line frequency $f_0$. The characteristics of such a filter are shown in Figure 3 where ordinates represent transmission coefficient and abscissae represent frequency.

In the pass range of this filter also the overall amplification of the control network 6 is greater than the ratio $$\left(\frac{Em}{Ea}\right)$$

of the voltages respectively induced in the main winding 15 and the auxiliary winding 16. In the highly attenuated range the amplification of the control network 6 is less than this ratio. The cut-off frequency $f_c$ lies between these ranges. When voltage is first applied to the windings 7, 8, and 9 of the stator from the power supply 10 voltages are induced in both the main rotor winding 15 and the auxiliary motor winding 16, these voltages having a frequency $f_0$ the same as line frequency as hereinabove explained. At this moment, due to the high transmission coefficient of the filter 18, the amplified voltage $E_o$ applied to the main winding 15 by the control network 6 is greater, preferably much greater, than the voltage $E_m$ induced in the main rotor winding by the rotating field. Since the amplified voltage $E_o$ is opposite in phase to the induced voltage $E_m$ in the main winding 15, the net voltage $E_t$ is also in opposite phase to the induced voltage $E_m$ and a torque is produced on the rotor in counter-clockwise direction as hereinabove explained, and the rotor 11 is accelerated in a counter-clockwise direction. As the speed of the rotor 11 increases in a counter-clockwise direction, the amplitude and frequency of the voltages induced in the main and auxiliary windings 15 and 16 increase, the amplitude of the voltages induced in the two windings being substantially proportional to the frequency of the induced voltages this frequency in turn being a linear function of the speed of rotation of the rotor.

In this case, as the slip frequency $f_s$ approaches the cut-off frequency $f_c$ of the filter 18 the amplification of the control network 6 decreases, thereby decreasing the value of voltage $E_o$ appearing at the output of the control network 6 and applied to the main winding 15 of the rotor 11, thus reducing the net voltage $E_t$ in the main winding 15. As the net voltage in the main winding falls off, the torque applied by the rotor to the load also falls off rapidly until it equalizes the torque required by the load and the motor operates at a constant speed corresponding to a slip frequency $f_s$ about equal to the cut-off frequency $f_c$. Again it will be apparent from the curve of figure 3 that at this speed because of the sharp cut-off characteristic of the filter 18, the torque furnished by the rotor varies rapidly for small changes in speed of the rotor so that for widely different loads the speed of motor operation will again be approximately that corresponding to a slip frequency $f_s$ about equal to the high cut-off frequency $f_c$.

In either case when using a high pass filter in the manner hereinabove explained, and a motor with a given load is operating at a speed corresponding to the cut-off frequency $f_c$, any tendency of the rotor to increase in speed due to a reduction in load causes a reduction in the net voltage in the circuit of the main winding 15, thus causing a reduction in the current flowing through the rotor main winding, thereby counteracting the tendency of the rotor to increase its speed. Similarly, any tendency of the rotor speed to decrease due to any increase in load when operating at such a speed, causes an increase in the net voltage in the circuit of the main winding 15, thus causing an increase in the amount of current flowing through the main rotor winding and thereby counteracting the tendency of the rotor to decrease its speed. Thus it is seen that when the speed of rotation is determined primarily by the characteristics of a high frequency cut-off filter, the speed of rotation remains substantially constant and at a value corresponding to the cut-off even though the load on the motor may vary widely. If the cut-off frequency $f_c$ is more than twice the line frequency $f_0$ the motor may be operated at a super-synchronous speed.

Even when the motor is operating in a speed range in which the speed is controlled to some extent by other factors, such as bearing friction, windage losses, and the back electromotive force induced in the stator and rotor windings, regulation of the speed may be improved by using a control network having high amplification in the pass range and a sharp cut-off filter in accordance with the principles hereinabove set forth.

From the foregoing description, it is clear that I am able to operate a motor at a super-synchronous speed by running the motor in a direction opposite to the direction of rotation of the magnetic field produced by the rotor and providing a control network with a high amplification at frequencies below the slip frequency corresponding to such speed.

I have discovered also that beneficial results are realized by feeding energy to the rotor main winding at higher frequencies than that supplied to the stator windings, preferably bearing an harmonic relationship to the frequency input to the amplifier. In the system described, the amplifier output includes energy at such higher frequency, which it is believed is a function of the variable impedance offered by the motor to the amplifier, which in turn is a function of the number of pairs of north and south poles set up in the motor.

While I have illustrated my invention as applied to a two pole, three phase motor, it will be clear that it may be applied to motors having any number of poles and to any type of motor having one element rotatable with respect to another and an arrangement for producing a magnetic field which rotates with respect to one of such elements and induces a voltage into a winding on the other element, which voltage may be applied through an amplifier circuit to another winding on that other element.

Accordingly, it will be seen that I have provided an improved system for varying the speed of a motor and for regulating and for maintaining the speed of a motor substantially constant and for causing a motor to operate at high speeds.

The system is subject to modification and alteration, without departing from the fundamental principles involved. The three phase input windings, for example, could be wound on the rotor, in which case the previously described rotor windings would be placed on the stator. Also, in lieu of relying on the amplifier as a frequency changer, a frequency changer coupled to the motor shaft might be employed.

Therefore, while I have described a preferred embodiment of my invention in some detail, I do not desire to be limited in my protection to such detail, except as may be necessitated by the appended claims.

I claim:

1. In an electrical motor having a stator and a rotor, means supported by the stator for producing a magnetic field which rotates in one direction therein, a current winding and a voltage winding on the rotor and linked by such rotating magnetic field, said current winding controlling the magnetic field in the rotor, means interconnecting said windings for so magnetizing the rotor that it rotates oppositely to the magnetic field of the stator.

2. In an electrical motor having a stationary member and a rotatable member, a set of windings on one of said members adapted to produce a magnetic field that rotates relative to said one member, a current winding and a voltage winding on the other member and linked by the rotating magnetic field of said first windings, means including an amplifier having its input connected to said voltage winding and its output connected to said current winding for producing in said current winding a current having a component of opposite phase to the voltage induced in said current winding by said magnetic field.

3. In an electric motor having means for producing a rotating magnetic field and a rotor winding linked with said field, the improvement which comprises an auxiliary coil linked with said magnetic field, said coil being arranged to rotate in synchronism with said rotor, and means including an amplifier responsive to the voltage induced in said auxiliary coil for controlling the current in said rotor winding.

4. In an electric motor having means for producing a rotating magnetic field and a rotor winding linked with said field, the improvement which comprises an auxiliary coil linked with said magnetic field, said coil being arranged to rotate in synchronism with said rotor, and means controlled by the voltage induced in said coil for producing a current in said winding having a component in phase opposition to the voltage induced therein.

5. In an electrical motor having a statiorary member and a rotatable member, a set of windings on one of said members adapted to produce a magnetic field that rotates relative to said one member, a main winding and an auxiliary winding on the other member, and means for feeding a voltage controlled by the voltage induced in said auxiliary winding into said main winding in phase opposition to the voltage induced in said main winding by said magnetic field.

6. In an electrical motor having a stationary member and a rotatable member, a set of windings on one of said members adapted to produce a magnetic field that rotates relative to said one member, a main winding and an auxiliary winding on the other member, and a control network interconnecting the main winding and the auxiliary winding for producing in the main winding a net voltage having a component in opposite phase to the voltage induced in said main winding by said magnetic field.

7. In an electrical motor having a stationary member and a rotatable member, a set of windings on one of said members adapted to produce a magnetic field that rotates relative to said one member, a main winding and an auxiliary winding on the other member, and means including an amplifier connected between the main winding and the auxiliary winding for producing in the main winding a net voltage having a component greater than the voltage induced in said main winding by said magnetic field and of opposite phase.

8. In an electrical motor having a stationary member and a rotatable member, means on one of said members for producing a rotating magnetic field, a main winding and auxiliary winding on the other member and linked by such rotating magnetic field, an amplifying network having a high input impedance and a low output impedance, the input and the output being respectively connected to said auxiliary winding and said main winding.

9. In an electrical motor having a stationary member and a rotatable member, means on one of said members for producing a rotating magnetic field, a main winding and an auxiliary winding on the other member and linked by such rotating magnetic field, and a control circuit including an amplifier and phase modifying means interconnecting said main winding and said auxiliary winding.

10. In an electrical motor having a stationary member and a rotatable member, means on one of said members for producing a rotating magnetic field, a main winding and an auxiliary winding on the other member and linked by such rotating magnetic field, and a circuit including an amplifier and a filter interconnecting said main winding and said auxiliary winding.

11. In an electrical motor having a stationary member and a rotatable member, means on one of said members for producing a rotating magnetic field, a main winding and an auxiliary winding on the other member and linked by such rotating magnetic field, a control circuit including an amplifier and a filter having an adjustable high cut-off frequency interconnecting said main winding and said auxiliary winding.

12. In an electrical motor having a stationary member and a rotatable member, a polyphase winding on one of said members adapted for connection to a power supply having a line frequency $f_o$ to produce a rotating magnetic field, a main winding and an auxiliary winding on the other member and linked by such rotating magnetic field, and a control circuit including an amplifier and a filter interconnecting said main winding and said auxiliary winding, said filter having a high cut-off frequency $f_c$ greater than the line frequency $f_o$.

13. In an electric motor for operation from a source of power having a line frequency $f_o$, a stator adapted to produce a magnetic field which rotates in one direction relative thereto at a speed corresponding to line frequency, a rotor having a current winding and a voltage winding, a network including an amplifier having its input and its output connected respectively to said voltage winding and said current winding, said network having an amplification factor over a range of frequencies including a frequency more than twice the line frequency which amplification factor is more than twice the ratio of the voltages respectively induced in the current winding and the voltage winding by the rotating magnetic field.

14. In combination, an electric motor having a stationary member and a rotatable member, a main winding and an auxiliary winding disposed on one of said members, input windings on said other member adapted, upon connection to an alternating current source, to produce a rotating magnetic field linking with said main and auxiliary windings, whereby alternating current energy will be induced therein, and means responsive to the energy induced in said auxiliary winding for feeding additional energy into said main winding.

15. In combination, an electric motor having a stationary member and a rotatable member, a main winding and an auxiliary winding disposed on one of said members, input windings on said other member adapted, upon connection to an alternating current source, to produce a rotating magnetic field linking with said main and auxiliary windings, whereby alternating current energy will be induced therein, and means responsive to the energy induced in said auxiliary winding for feeding additional energy into said main winding at a frequency above that induced therein from said input windings.

16. In combination, an electric motor having a stationary member and a rotatable member, a winding disposed on one of said members, input windings on said other member adapted, upon connection to an alternating current source, to produce a rotating magnetic field linking with said first mentioned winding, whereby alternating current energy will be induced therein, and means for feeding additional energy into said first mentioned winding at a frequency above that induced therein from said input windings.

17. In combination, an electric motor having a stationary member and a rotatable member, a winding disposed on one of said members, input windings on said other member adapted, upon connection to an alternating current source, to produce a rotating magnetic field linking with said first mentioned winding, whereby alternating current energy will be induced therein, and means for feeding additional energy into said first mentioned winding at a frequency above that induced therein from said input windings, and in accordance with variations in load on said motor.

18. An induction type motor comprising means for producing a rotating magnetic field, means including a main winding and an auxiliary winding mounted with said windings linked by such rotating magnetic field, and means for feeding energy into said main winding in accordance with the voltage induced in said auxiliary winding from such rotating magnetic field.

WILLARD C. ROBINETTE.

REFERENCES CITED

The following references are of record in the file of this patent:

UNITED STATES PATENTS

| Number | Name | Date |
|---|---|---|
| Re. 20,568 | Bedford | Dec. 7, 1937 |
| 1,777,211 | Osanna et al. | Sept. 30, 1930 |
| 2,185,700 | Bedford | Jan. 2, 1940 |
| 2,264,854 | Mittag | Dec. 2, 1941 |